United States Patent [19]

Merlo et al.

[11] Patent Number: 5,703,476
[45] Date of Patent: Dec. 30, 1997

[54] REFERENCE VOLTAGE GENERATOR, HAVING A DOUBLE SLOPE TEMPERATURE CHARACTERISTIC, FOR A VOLTAGE REGULATOR OF AN AUTOMOTIVE ALTERNATOR

[75] Inventors: Mauro Merlo, Torre D'Isola-Pavia; Franco Cocetta, Premariacco; Fabio Marchió, Sedriano; Massimo Grasso, Asti; Bruno Murari, Monza-Milano, all of Italy

[73] Assignee: SGS-Thomson Microelectronics, S.r.l., Agrate Brianza, Italy

[21] Appl. No.: 674,321

[22] Filed: Jul. 1, 1996

Related U.S. Application Data

[60] Provisional application No. 60/010,550, Jan. 25, 1996.

[30] Foreign Application Priority Data

Jun. 30, 1995 [EP] European Pat. Off. ............ 95830280

[51] Int. Cl.⁶ .................................................. G05F 3/16
[52] U.S. Cl. ........................ 323/313; 323/314; 323/907
[58] Field of Search ........................... 323/314, 313, 323/315, 316, 907; 327/530, 538, 539

[56] References Cited

U.S. PATENT DOCUMENTS

| | | | |
|---|---|---|---|
| 4,454,467 | 6/1984 | Sakaguchi | 323/313 |
| 4,742,292 | 5/1988 | Hoffman | 323/314 |
| 4,990,846 | 2/1991 | Buck et al. | 323/314 |
| 5,159,260 | 10/1992 | Yoh et al. | 323/313 |
| 5,225,716 | 7/1993 | Endo et al. | 307/296.8 |
| 5,239,256 | 8/1993 | Makoto | 323/313 |
| 5,241,261 | 8/1993 | Edwards et al. | 323/313 |
| 5,309,083 | 5/1994 | Pierret et al. | 323/313 |
| 5,384,740 | 1/1995 | Etoh et al. | 365/189.09 |
| 5,528,128 | 6/1996 | Melse | 323/313 |
| 5,528,287 | 6/1996 | Agiman | 323/284 |
| 5,545,977 | 8/1996 | Yamada et al. | 323/313 |
| 5,612,613 | 3/1997 | Dutt et al. | 323/314 |

FOREIGN PATENT DOCUMENTS

| | | |
|---|---|---|
| 0350077 | 10/1990 | European Pat. Off. . |
| 0498727 | 12/1992 | European Pat. Off. . |
| 05577339 | 1/1993 | European Pat. Off. . |
| 91 07713 | 5/1991 | WIPO . |

*Primary Examiner*—Adolf Berhane
*Attorney, Agent, or Firm*—Robert Groover; Betty Formby

[57] ABSTRACT

A reference voltage generator having a dual slope temperature characteristic, for use in an automotive alternator voltage regulator, comprises a bandgap circuit (R1,R2,R3,R4) which generates a voltage (A) having a thermal drift coefficient of zero and a voltage (B) having a non-zero thermal drift coefficient. These voltages are applied to a voltage divider (R5,R6) and a voltage-follower type of circuit (OPA1). A unidirectional conduction amplifier circuit (OPA2) has an input terminal connected to an intermediate point (C) on the voltage divider. A second voltage divider (R7,R8) is connected between the output terminals of the voltage-follower circuit (D) and the amplifier circuit (E). An intermediate node (F) of the second voltage divider is coupled to an output terminal (VREF) of the generator.

26 Claims, 2 Drawing Sheets

REFERENCE VOLTAGE GENERATOR, HAVING A DOUBLE SLOPE TEMPERATURE CHARACTERISTIC, FOR A VOLTAGE REGULATOR OF AN AUTOMOTIVE ALTERNATOR

CROSS-REFERENCE TO RELATED APPLICATION

This application claims the benefit of U.S. Provisional Application No. 60/010,550 filed Jan. 25, 1996. This application claims priority from EPC app'n 95830280.4, filed Jun. 30, 1995, which is hereby incorporated by reference.

BACKGROUND AND SUMMARY OF THE INVENTION

This invention relates to reference voltage generating circuits, in particular to such circuits as can be used in monolithically integratable voltage regulators for automotive alternators.

The principal function of a regulator for automotive alternators is to drive the field winding of the alternator so as to have an appropriate voltage value produced at the alternator output for charging the battery and powering any electric equipment of the motor vehicle.

The battery charging process is heavily dependent on both the type of battery used and the technology employed in the battery construction, the leading variable in importance being represented here by the temperature at which the charging takes place.

Most suppliers of alternators currently demand an alternator output voltage of about 14.5V (at 25° C.) which tapers with increasing temperature, but the problem has recently been raised of providing an output voltage which would decrease in the −35° C. to 70° C. range more rapidly than from 70° C. to 150° C., most probably because batteries are now manufactured using new technologies (different materials). It is obviously the voltage regulator of the alternator that is to fill this demand.

Modern automotive designs provide for an ever expanding utilization of electronic devices to control the main functions of motor vehicles (including, of course, motor boats), and a current trend in this respect favors the concentration of several functions in a single integrated circuit device.

For instance, a voltage regulating circuit for the alternator and a troubleshooting circuit for the vehicle own equipment may be integrated monolithically to a single device.

However, no circuitry has yet been made available that would allow a voltage regulator for automotive alternators, having a built-in reference voltage generator with a dual slope temperature characteristic, to be integrated monolithically.

The underlying technical problem of this invention is, therefore, to provide a reference voltage generator having a dual slope temperature characteristic, for use in an alternator voltage regulator, which can be integrated monolithically with the latter on a single integrated circuit device.

This problem is solved by a reference voltage generator as indicated above and defined in the characterizing portions of the appended claims to this specification.

The features and advantages of a reference voltage generator according to the invention will be apparent from the following detailed description of an embodiment thereof, given by way of example and not of limitation with reference to the accompanying drawings.

According to the present invention, a temperature-dependent voltage is extracted from within a bandgap reference circuit, and is combined with the temperature-independent output of the bandgap circuit to produce the desired combined characteristic.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
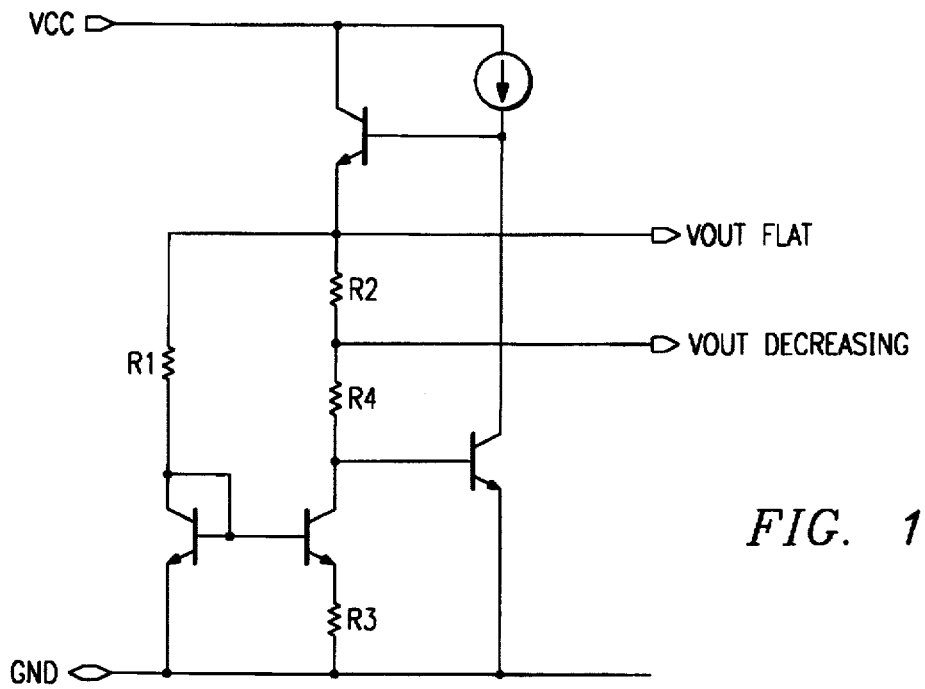
FIG. 1 is a circuit diagram for a modified bandgap circuit to be used in a reference voltage generator according to the invention.

The numerous innovative teachings of the present application will be described with particular reference to the presently preferred embodiment (by way of example, and not of limitation), in which:

The diagram in FIG. 1 is typical for a bandgap circuit (well known to those skilled in the art), which is used to produce an output voltage VOUT which is constant with temperature, namely a flat characteristic.

In this case, however, instead of the single resistor of conventional design, an equivalent pair of resistors, R2 and R4, are used to form a voltage divider. (Preferably values are chosen so that R1=R2+R4.)

Thus, from a single bandgap circuit, a voltage can be generated whose value, as simple calculations show, decreases as temperature rises.

It is in this way that a reference voltage generator with high accuracy can be provided which has a dual slope temperature characteristic, is monolithically integratable, and adapted for automotive applications where the range of operating temperatures happens to be particularly wide.

Figure 2:
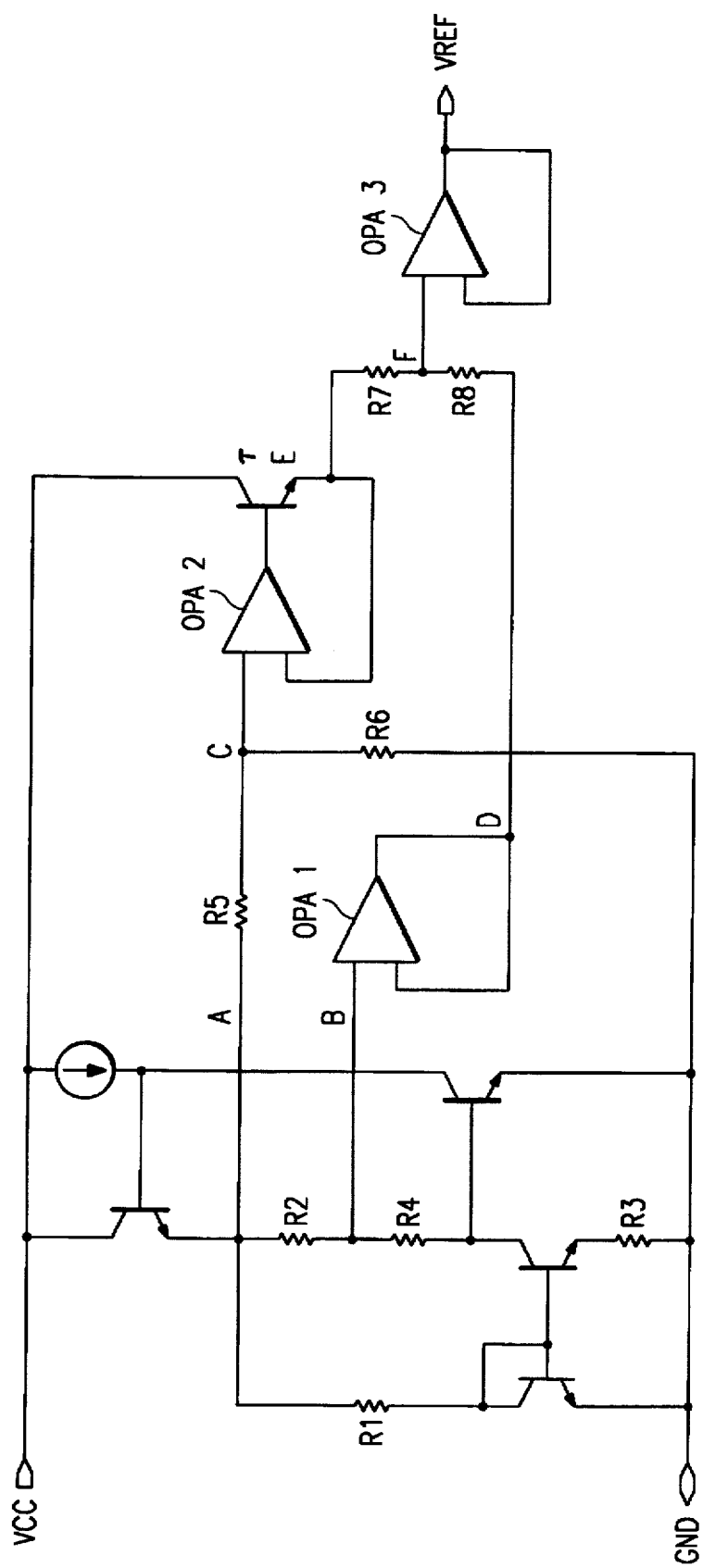
FIG. 2 is a circuit diagram for a reference voltage generator with dual slope temperature characteristic according to the invention.

For the purpose, the circuit diagram of FIG. 2 is shown to include a modified bandgap circuit inserted between a ground GND and a power supply line Vcc.

The output terminal A supplies a voltage of constant value, whereas the terminal B, which is connected to an intermediate node of the voltage divider R2, R4, supplies a voltage whose value decreases with a rising temperature. (On this terminal the "Vbe" term dominates, and the cancellation of temperature coefficients of a bandgap reference does not occur.)

Connected between the terminal A and ground is another voltage divider formed by resistors R5 and R6.

Connected to the terminal B is an input terminal of an operational amplifier OPA1 whose output terminal D is feedback connected to a second input terminal.

The operational amplifier, as feedback in the manner just described, has a gain of unity and forms a circuit of the voltage-follower type, well known to the skilled ones in the art.

A second operational amplifier OPA2, of which the final, transistor T has been shown, is also feedback for a gain of unity.

The second amplifier has an input terminal connected to an intermediate node C of the voltage divider R5, R6.

A final voltage divider, consisting of resistors R7 and R8, is inserted between the output terminal D of the operational amplifier OPA1 and the output terminal E of the operational amplifier OPA2 formed by the emitter terminal of the NPN transistor T.

In this case, the operational amplifier forms, by means of the transistor T, a circuit element which is also of the voltage-follower type, but with a basic characteristic of unidirectional conduction.

To perform this function, a diode could be provided as the final component of the operational amplifier OPA2, with the cathode terminal of the diode arranged to form the output terminal of the amplifier.

Finally, connected between an intermediate node F of the voltage divider R7, R8 and the output terminal of the reference voltage VREF generator, is a further operational amplifier OPA3 feedback for a gain of unity.

Figure 3:
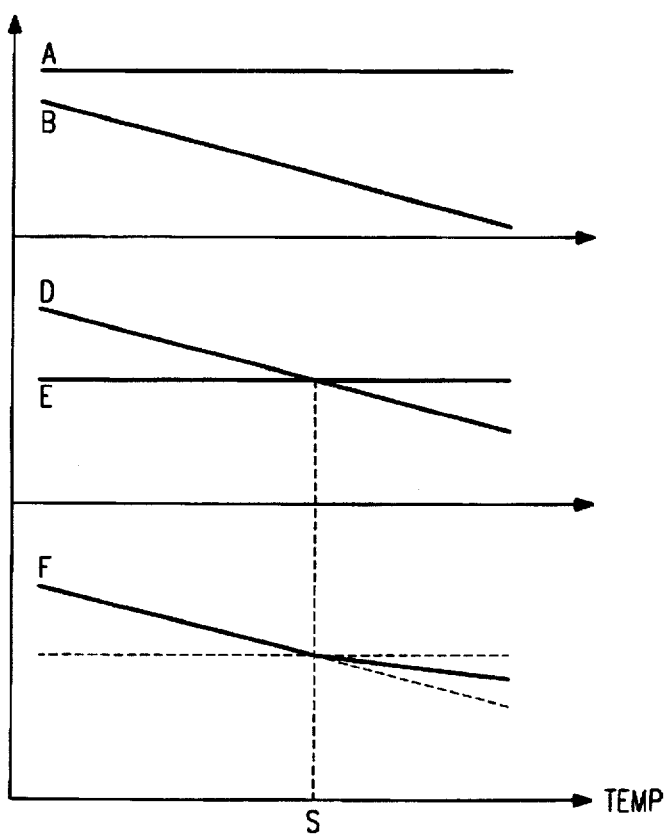
FIG. 3 illustrates the characteristic obtainable versus temperature from a reference voltage generator according to the invention.

Illustrated by FIG. 3 are the characteristics versus temperature of the voltage signals at the various terminals and circuit nodes of the circuit shown in FIG. 2, namely A, B, D, E and F.

To revert to the aforementioned demand for a dual slope characteristic to charge automotive batteries, the reference voltage generator of this invention can provide a reference voltage having a decreasing behavior versus temperature with two different slopes separated by a turning point at 70° C., the segment with a steeper slope of the characteristic lying between −35° C. and 70° C., and the shallower segment from 70° C. to 150° C.

The solution to the problem is based on a combination of a first reference having a thermal coefficient of zero with a second reference having a thermal coefficient which is exactly the equal of that specified for the −35° C. to −70° C. segment.

To obtain the above references, a modification has been made in the Widlar bandgap circuit (FIG. 1), as mentioned above, whereby the values of the resistors R2 and R4 are altered to provide a voltage having a zero thermal coefficient and a voltage having a negative thermal coefficient.

The voltage with zero thermal coefficient, A, is applied to the resistive divider comprising R5 and R6, and the voltage with negative thermal coefficient, B, is applied to the operational amplifier OPA1, as feedback for a gain of unity, which is to provide the signal B at a low impedance D.

The resistive divider R5 and R6 establishes the slope turning point of the final reference VREF; the signal C, being the divided signal A, is applied to the operational amplifier OPA2, also feedback for a gain of unity by the use of an NPN transistor.

The signals D and E are combined by the resistive set R7, R8 in the following manner.

At temperatures below "S", FIG. 3, the voltage D is higher than the voltage E but the operational amplifier OPA2, feedback as mentioned, cannot draw current and, since no current is flowed through the leg R7, R8, the voltage F will be the same as voltage D.

At temperatures above "S", the voltage D is lower than E, and the operational amplifier OPA2 can, therefore, be operated to supply current to the leg R7, R8, whereby the resultant voltage F will be a split share of D and E. The operational amplifier OPA3 provides the voltage F at low impedance.

Major features of the reference voltage generator of this invention are high accuracy, low noise, and enhanced flexibility in that, by the mere alteration in value of a few resistors, we are now able to change both the slopes of the characteristic versus temperature and the turning point of such slopes.

And where a demand existed from the market for reference voltage generators having a temperature characteristic with multiple slopes, it would be sufficient to increase the number of the resistors (e.g., R4, R41, R42, . . . ) in the voltage divider of the bandgap circuit and tap the voltages from the various resultant intermediate nodes (B, B1, B2, . . . ).

Each of these nodes would be connected to the final node F through a respective voltage-follower circuit and a respective resistor. The remainder of the circuit may either be left unaltered or duplicated in turn.

MODIFICATIONS AND VARIATIONS

It should be understood that modifications, integrations, and substitutions of elements may be made to the embodiments described above without departing from the protection scope of the following claims.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A reference voltage generator having a dual slope temperature characteristic and being integratable monolithically, for use in a voltage regulator, characterized in that it comprises a circuit means effective to generate a first voltage having a thermal drift coefficient of zero and a second voltage having a predetermined non-zero thermal drift coefficient, a first voltage divider and first voltage-follower circuit which are respectively applied said first and second voltages, a unidirectional conduction amplifier circuit having an input terminal connected to an intermediate node of the first voltage divider, and a second voltage divider connected between an output terminal of the amplifier circuit and an output terminal of the voltage-follower circuit, an intermediate node of said second voltage divider being coupled to an output terminal of the generator.

2. A voltage generator according to claim 1, wherein, connected between the intermediate node of the second voltage divider and the output terminal of the generator, is a second circuit of the voltage-follower type.

3. A voltage generator according to claim 2, wherein the circuit means effective to generate said first and second voltages comprises a bandgap type of circuit.

4. A voltage generator according to claim 2, wherein the value of said second voltage decreases as temperature rises.

5. A voltage generator according to claim 2, wherein the unidirectional conduction amplifier circuit comprises a feedback operational amplifier having a circuit element of junction type at its output end.

6. A voltage generator according to claim 1, wherein the circuit means effective to generate said first and second voltages comprises a bandgap type of circuit.

7. A voltage generator according to claim 6, wherein said second voltage is generated between a ground and an intermediate node of a voltage divider, between one terminal of which and said ground said first voltage is generated.

8. A voltage generator according to claim 6, wherein the value of said second voltage decreases as temperature rises.

9. A voltage generator according to claim 6, wherein the first voltage-follower circuit comprises a feedback operational amplifier having a gain of unity.

10. A voltage generator according to claim 6, wherein the unidirectional conduction amplifier circuit comprises a feedback operational amplifier having a circuit element of junction type at its output end.

11. A voltage generator according to claim 6, wherein the second voltage follower circuit is a feedback operational amplifier having a gain of unity.

12. A voltage generator according to claim 1, wherein the value of said second voltage decreases as temperature rises.

13. A voltage generator according to claim 1, wherein the first voltage-follower circuit comprises a feedback operational amplifier having a gain of unity.

14. A voltage generator according to claim 1, wherein the unidirectional conduction amplifier circuit comprises a feedback operational amplifier having a circuit element of junction type at its output end.

15. A reference voltage generator having a multi-slope temperature characteristic and being integratable monolithically, for use in a voltage regulator, characterized in that it comprises a circuit means effective to generate a first voltage having a thermal drift coefficient of zero and at least second and third voltages having predetermined respective non-zero thermal drift coefficients, a first voltage divider and at least first and second voltage-follower circuits which are respectively applied said first, second and third voltages, a unidirectional conduction amplifier circuit having an input terminal connected to an intermediate node of the first voltage divider and an output terminal connected through a first resistive element to an output circuit node which is coupled to an output terminal of the reference voltage generator, also connected to said output circuit node through a second and a third resistive element, respectively, being respective output terminals of said at least first and second voltage follower circuits.

16. A voltage generator according to claim 15, wherein, connected between the output circuit node and the output terminal of the generator is a circuit of the voltage-follower type.

17. A voltage generator according to claim 16, wherein the circuit means effective to generate said first and at least second and third voltages comprises a circuit of the bandgap type.

18. A voltage generator according to claim 15, wherein the circuit means effective to generate said first and at least second and third voltages comprises a circuit of the bandgap type.

19. A voltage generator according to claim 16, wherein the circuit means effective to generate said first and at least second and third voltages comprises a circuit of the bandgap type.

20. A voltage generator according to claim 15, wherein the unidirectional conduction amplifier circuits are each comprised of a feedback operational amplifier having an output terminal connected to said connecting node.

21. A reference voltage generator having a multi-slope temperature characteristic and being integratable monolithically, for use in a voltage regulator, characterized in that it comprises a circuit means effective to generate a first voltage having a thermal drift coefficient of zero and at least second and third voltages having predetermined respective non-zero thermal drift coefficients, at least one first voltage divider and at least first and second voltage-follower circuits which are respectively applied said first, second and third voltages, at least one unidirectional conduction amplifier circuit having an input terminal connected to an intermediate node of said at least one first voltage divider and an output terminal connected through a first resistive element to an output circuit node which is coupled to an output terminal of the reference voltage generator, also connected to said output circuit node through a second and a third resistive element, respectively, being respective output terminals of said at least first and second voltage follower circuits.

22. A voltage generator according to claim 21, wherein, connected between the output circuit node and the output terminal of the generator is a circuit of the voltage-follower type.

23. A voltage generator according to claim 22, wherein the circuit means effective to generate said at least one first voltage and at least second and third voltages comprises a circuit of the bandgap type.

24. A voltage generator according to claim 22, wherein each unidirectional conduction amplifier circuit comprises a feedback operational amplifier having an output terminal connected to said connecting node.

25. A voltage generator according to claim 21, wherein the circuit means effective to generate said at least one first voltage and at least second and third voltages comprises a circuit of the bandgap type.

26. A voltage generator according to claim 21, wherein each unidirectional conduction amplifier circuit comprises a feedback operational amplifier having an output terminal connected to said connecting node.

* * * * *